United States Patent [19]

Hesnault

[11] 4,138,966
[45] Feb. 13, 1979

[54] INSTALLATION FOR THE RACETRACK TRAINING OF RACEHORSES

[75] Inventor: Raymond Hesnault, Boitron, Orne, France

[73] Assignee: Etablissements Bouvry, Sees, Orne, France

[21] Appl. No.: 786,536

[22] Filed: Apr. 11, 1977

[30] Foreign Application Priority Data

Apr. 14, 1976 [FR] France .................. 76 11089

[51] Int. Cl.² .......................................... A01K 15/00
[52] U.S. Cl. ...................................... 119/29; 119/120
[58] Field of Search .................. 119/29, 120; 198/189

[56] References Cited

U.S. PATENT DOCUMENTS

| 2,500,805 | 3/1950 | Costello | 119/29 |
| 2,808,146 | 10/1957 | Leach | 198/189 |
| 2,871,915 | 2/1959 | Hogan | 119/29 X |
| 3,291,099 | 12/1966 | Crane et al. | 119/29 |
| 3,965,866 | 6/1976 | Lorentz et al. | 119/29 |

Primary Examiner—Hugh R. Chamblee
Attorney, Agent, or Firm—Karl W. Flocks

[57] ABSTRACT

This installation comprises at least one follower means moved and guided to follow the path of the racetrack at a variable speed which can correspond to a selected gait, such as the trot. Each follower means bears a directing device connected by a harness to one of the horses to be trained, so that the training of each horse, at the chosen gait, is done without the help of any rider. A drive means moves the follower means or the group of follower means. Each follower means may be a carriage traversing a guide. The guide means may be a fork whose branches are connected by a tie to the harness of the horse.

4 Claims, 9 Drawing Figures

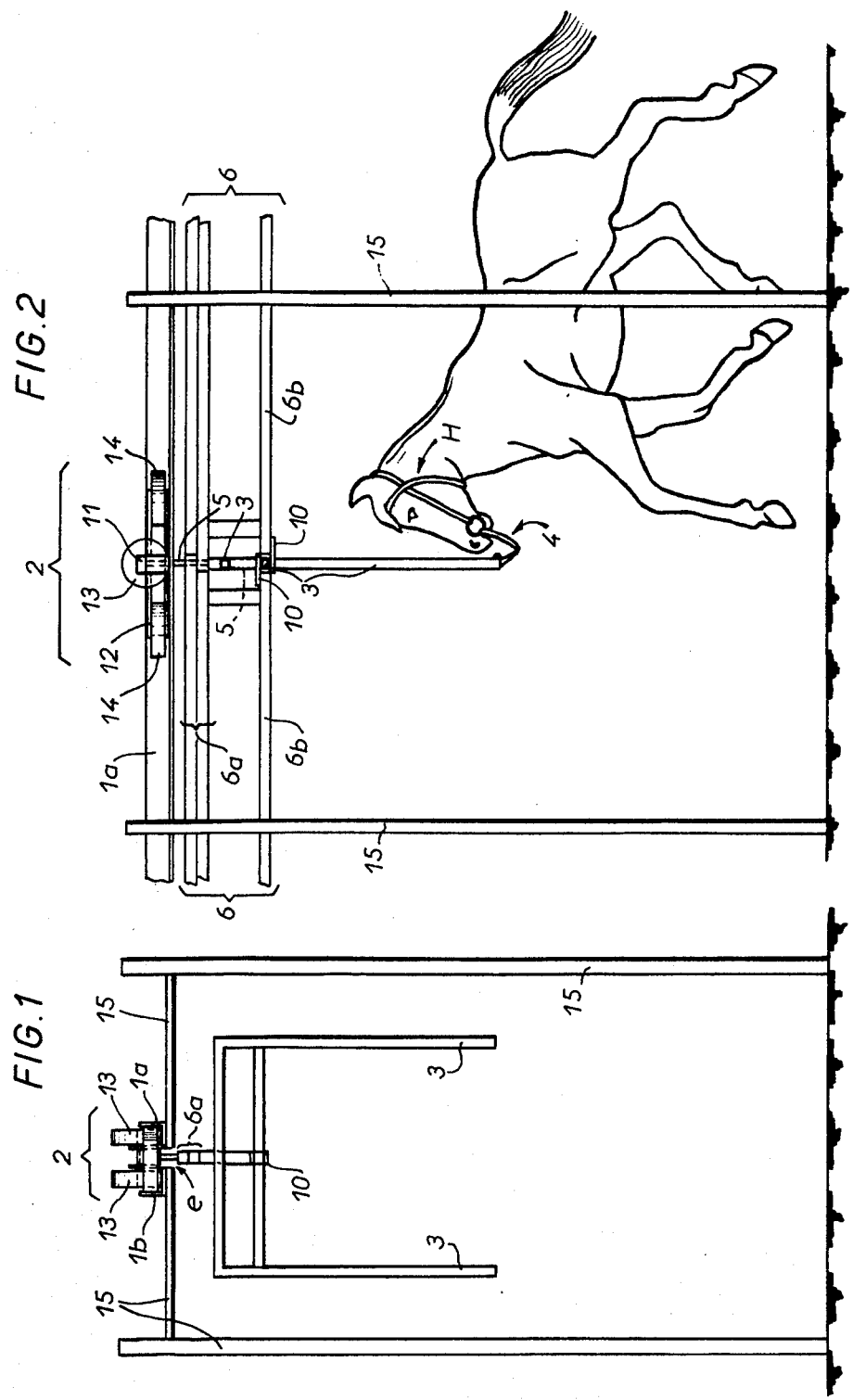

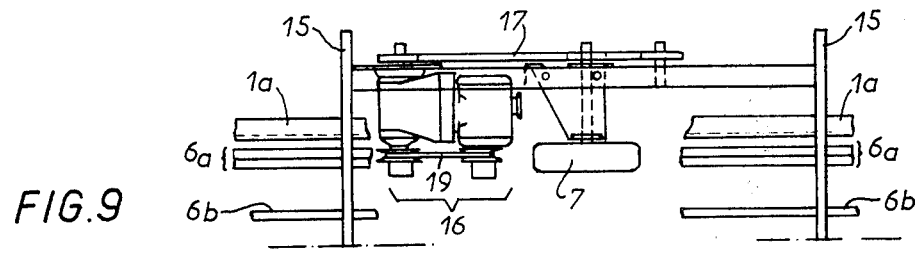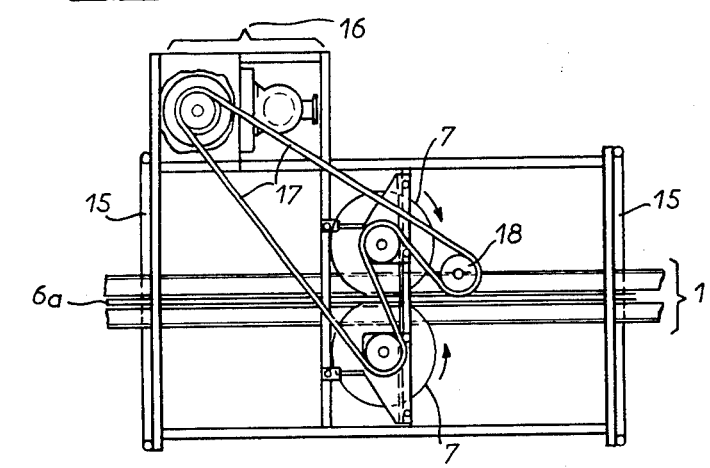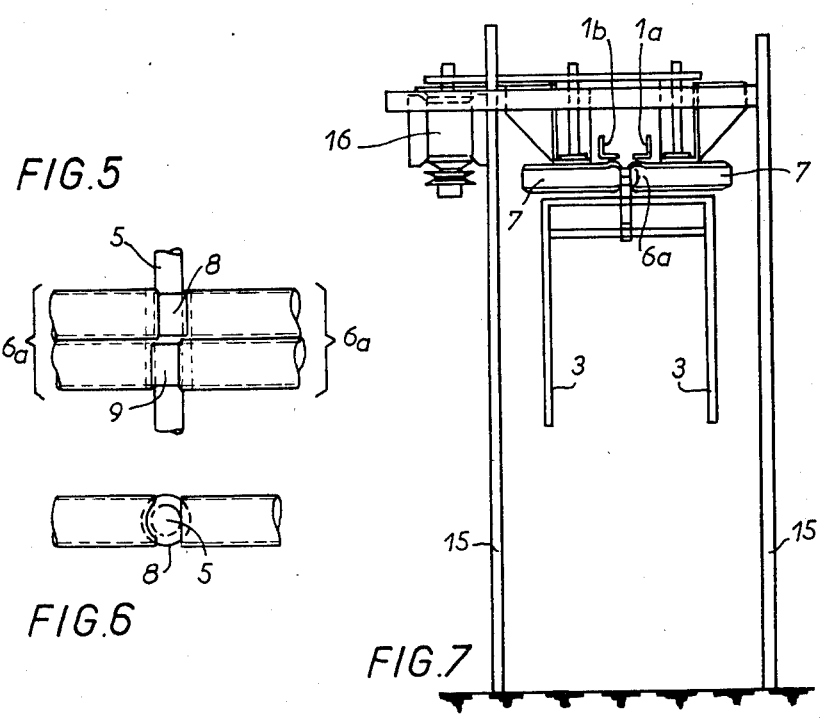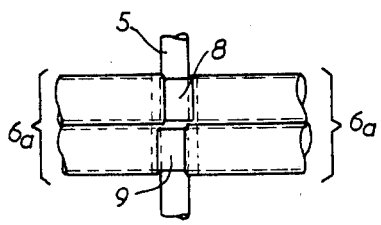

INSTALLATION FOR THE RACETRACK TRAINING OF RACEHORSES

The present invention relates to an installation for the racetrack training of racehorses.

This installation is characterised in that it comprises at least one follower means moved and guided to follow the path of the racetrack at a variable speed which can correspond to a selected gait, such as the trot, each follower means bearing a directing device connected by a harness to one of the horses to be trained, so that the training of each horse, at the chosen gait, is done without the help of any rider.

A drive means moves the follower means or the group of follower means.

Each follower means may be a carriage traversing a guide.

The directing means may be a fork whose branches are connected by a tie to the harness of the horse.

Other characteristics and advantages of the present invention will emerge from the description which follows with reference to the accompanying drawings in which:

FIG. 1 is a front view and partial section of an installation according to the invention, regarded at the height of one of the cross-beams supporting an aerial guide;

FIG. 2 is a view in side elevation of a portion of this installation;

FIGS. 5 and 6 are views, respectively in elevation and from above, of the upper articulation of the articulated elements;

FIG. 7 is a front view and partial section of the installation, regarded at the height of a drive means provided for the movement of the articulated elements;

FIG. 8 is a view from above of this drive device; and

FIG. 9 is a view in side elevation and section.

Figure 3:
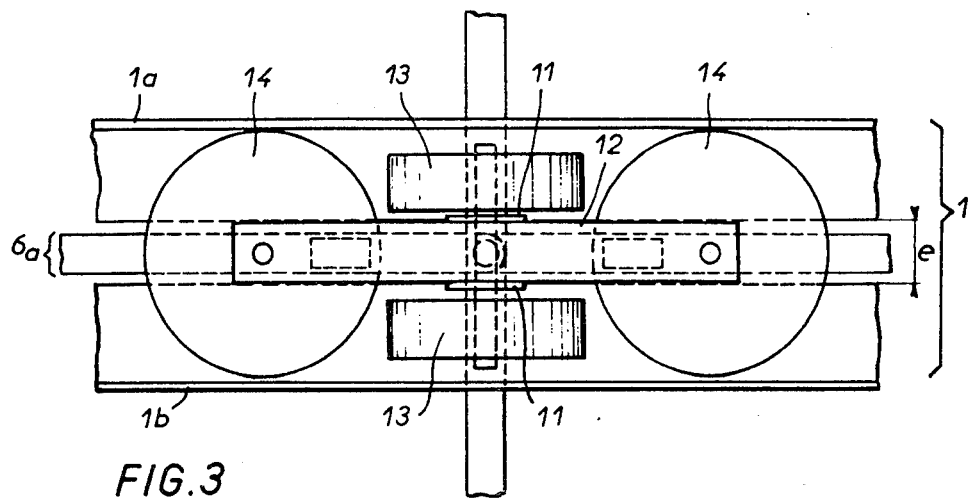
FIG. 3 is a view on a larger scale and from above of a carriage arranged on a portion of the aerial guide.
Figure 4:
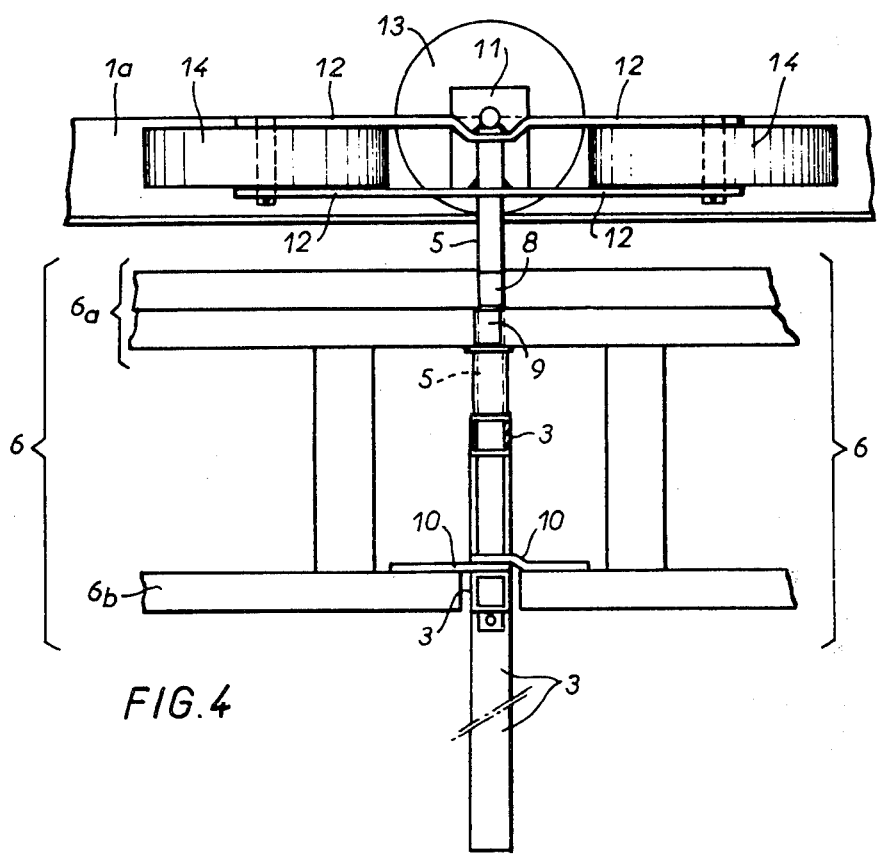
FIG. 4 is a view in side elevation and partial section of this same carriage, at which is suspended a vertical fork whose shaft serves as a pivot for the articulated elements.

In the embodiments shown, an installation for the racetrack training of racehorses, without the help of any rider or jockey, comprises an aerial guide 1, in which carriages 2 can circulate and at each of which is suspended a vertical fork 3 whose branches are connected by a tie 4 to the harness H of one of the horses to be trained (FIGS. 1 and 2).

Each fork 3 is suspended at its carriage 2 by a shaft 5 serving as an articulation pivot for two brace elements 6. A series of elements of this type 6 therefore exists articulated one following the other on the shafts 5 of the forks 3. The group of articulated elements 6 constitutes an endless chain moved by the direct action of two drive rollers 7 applied on both sides of the upper member 6a of the articulated elements.

Each upper member 6a may be formed by two twin tubes. In this embodiment, two twin tubular members are to be seen articulated on one shaft 5 by eye-bolts, the upper one 8 fixed to the upper tube of one member, the other 9 fixed to the lower tube of the other member (FIGS. 5 and 6).

The lower members 6b of the bracing elements 6 may also be tubular but each limited to a single tube. The articulation on the shaft 5 of two tubular lower members 6b is effected by means of two strap-hinges 10, each member bearing one strap-hinge.

Each carriage 2 is constituted by a frame comprising two vertical flanges 11 and two horizontal flanges 12. The vertical flanges bear vertical rollers 13 capable of rolling on the horizontal wings of "L" rails (1a and 1b) forming the aerial guide 1. The horizontal flanges bear horizontal rollers 14 capable of rolling on at least one of the vertical wings of the rails (1a and 1b) along the curves of the installation.

The rails (1a and 1b) are parallel and form between them a space e to allow passage for the shafts 5 of the forks 3.

The rails (1a and 1b) constituting the aerial guide 1 are borne by gantry frames 15 or other similar supports (jibs, columns, towers, etc.).

At the site of the installation, the gantry frames support the device provided for the movement of the articulated elements 6 hence of the carriages 2 and of the forks 3. This device comprises the two rollers 7 applied on the sides of the upper members 6a, a gear-reducing unit 16 and a belt 17 (or a chain) for driving the rollers 7 through a return element 18 to obtain, of course, reverse rotations for the application rollers 7. These rollers may advantageously, but not exclusively, be constituted by pressure-adjustable types (FIGS. 7 to 9).

It will be self-evident, that, along for example the length of the installation, the latter can comprise several drive devices for moving the articulated elements 6, these devices being arranged at different points on the path of the installation which, itself, follows the course of the racetrack.

The speed of movement is selected to correspond to a gait or exercise of a horse, such as the trot. This speed can be made variable over a large range and, for this purpose, the device comprises a speed varier of the type, for example, in which a trapezoidal belt 19 connects two pulleys of which one at least has a variable groove.

On account of the movement imparted to them, the carriages 2 behave as means for following the path imposed by the aerial guide 1 and communicate to the horses, through the forks 3 or guide means, the pace order to make them travel around the racetrack without a rider and to prepare them for racing.

Forks 3 or directing means are connected by any suitable ties, tethers, reins or the like, to the harnesses which may be snaffle bridles, halters, cavessons or the like.

The racetrack itself is of beaten soil or other loose substance, and the last horse of the line of horses in training in the installation according to the invention, may draw a light harrow or other instrument provided with teeth, in order to maintain the track loose after each passage of the line of horses.

The installation may lastly be covered or uncovered.

It is to be understood that the present invention has only been described and shown by way of a preferred example and that it will be possible to introduce equivalents into its constituent elements without, however, departing from the scope of the invention which is defined in the following claims.

Thus the installation which, of course, forms a closed loop, has sufficiently long straight paths for effective training.

Lastly, in the particular case of training a colt, a monitor may be positioned on a carriage 2 or on an extension of the latter.

I claim:

1. An installation for the racetrack training of racehorses comprising
an aerial guide;
a plurality of follower means connected together at regular intervals and each including a carriage traversing said aerial guide;
articulated elements connecting together said plurality of follower means;
drive means moving each of said follower means to follow a path of a racetrack at a variable speed which can correspond to a selected pace and including
two drive roller applying direct action on two sides of said articulated elements
a directing means borne by each of said follower means;
a harness connecting said directing means to a horse to be trained;
said directing means including a fork having branches which are connected by a tie to said harness
an articulation pivot for two of said articulated elements connected to one of said carriages traversing said aerial guide and to one of said directing means.

2. An installation according to claim 1 wherein said aerial guide for said follower means includes two parallel aerial rails forming a space between them to allow a passage for said directing means suspended at each of said follower means.

3. An installation according to claim 2 wherein said carriage includes wheels bearing on horizontal portions of said parallel rails,
and rollers bearing on at least a vertical portion of one of said rails.

4. Installation according to claim 1, wherein said aerial guide is supported by a succession of gantry frames over the whole path of the racetrack.

* * * * *